(12) United States Patent
Berney

(10) Patent No.: US 6,644,555 B1
(45) Date of Patent: Nov. 11, 2003

(54) CHIP CARD COMPRISING AN ANTENNA

(75) Inventor: Jean-Claude Berney, Rue des Fossés (CH)

(73) Assignee: NJC Innovations, Morges (CH)

( * ) Notice: Subject to any disclaimer, the term of this patent is extended or adjusted under 35 U.S.C. 154(b) by 0 days.

(21) Appl. No.: 10/031,648

(22) PCT Filed: May 3, 2000

(86) PCT No.: PCT/CH00/00242

§ 371 (c)(1),
(2), (4) Date: Apr. 12, 2002

(87) PCT Pub. No.: WO00/69016

PCT Pub. Date: Nov. 16, 2000

(30) Foreign Application Priority Data

May 7, 1999 (CH) ................................. 867/99

(51) Int. Cl.[7] .............................................. G06K 19/06
(52) U.S. Cl. ...................................... 235/492; 343/788
(58) Field of Search .............................. 235/492, 788; 343/728, 787, 788, 867

(56) References Cited

U.S. PATENT DOCUMENTS 4,155,091 A   5/1979   Vorie ........................... 343/748
5,583,330 A * 12/1996  Fallah et al. ................. 235/449
6,386,459 B1 * 5/2002  Patrice et al. ............... 235/492

FOREIGN PATENT DOCUMENTS

EP         0 762 535        3/1997

* cited by examiner

Primary Examiner—Thien M. Le
Assistant Examiner—Lisa M. Caputo
(74) Attorney, Agent, or Firm—Van Tassel & Associates; Kurt D. Van Tassel; Deborah G. VandenHoff

(57) ABSTRACT

The invention concerns an RF-type contactless chip card, comprising a sensor coil (1), an electronic circuit (2) connected to the coil and an antenna (3) made form a material with high magnetic permeability, including a first part located substantially in the plane of the coil upper surface (A), a second part located substantially in the plane of the coil lower surface (B) and a connecting part (C) located in the center of the coil. The latter part is dimensioned relative to the antenna (3) such that the voltages induced at its terminals are of the same order of magnitude, whether the antenna is parallel or perpendicular to the lines of flux generated by a reader.

8 Claims, 3 Drawing Sheets flux

⇐ flux

CHIP CARD COMPRISING AN ANTENNA

FIELD OF INVENTION

Figure 1A:
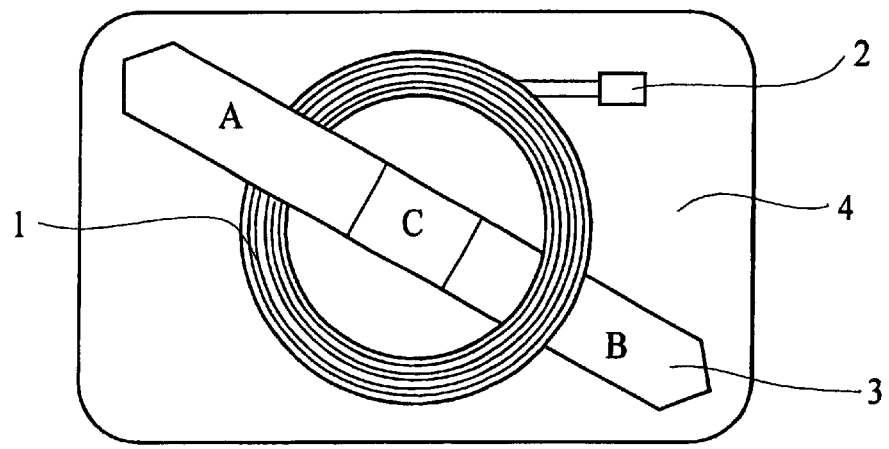

The present invention concerns a contactless smart card, of the RF (radio-frequency) type.

BACKGROUND OF INVENTION

Numerous embodiments of this type of card are available on the market. They generally include an electronic module including a sensor coil associated with an integrated circuit, this coil allowing, on the one hand, RF signals to be transmitted, and on the other hand, the power necessary for the electronic module to operate to be supplied. U.S. Pat. No. 4,115,091 and European Patent No. 762 535 disclose examples of such embodiments. The simplest cards comprise only a code which can be read remotely, but more and more read/write smart cards can also be found including an EEPROM type memory capable of saving its data even in the absence of a power source. Writing in such memories requires a relatively large amount of power which has to be taken across the terminals of the sensor coil. This may pose problems, particularly in << hands free >> access systems which constitute one of the major applications of such cards.

One solution for obtaining the power necessary for the card to operate at the greatest possible distance is to use a coil with a larger surface area allowing a maximum of flux to be picked up. Thus, round coils often have a diameter close to the width of the card and, in certain cases, rectangular coils are even used which cover practically the entire surface of the card. Another possibility consists in integrating antennas made of materials with high permeability in the card in order to concentrate the flux passing in proximity to the card at the centre of the sensor coil. The document WO. 98/52141 discloses such a system which allows coils of small diameter to achieve performances equivalent to those obtained with cards of large diameter.

However, a major problem remains. Indeed, in both the aforementioned cases, the maximum flux in the coil is only obtained when the card has a well defined orientation relative to the lines of flux generated by the reader. When the position of the card is changed, the flux quickly decreases and there are even numerous neutral positions where the flux in the coil is quite simply zero or, at least, close to zero. This obviously poses serious problems, particularly within the scope of << hands free > applications since the position of the card relative to the lines of flux generated by the reader may be very variable depending upon the person carrying it and the place where he puts his card.

BRIEF SUMMARY OF INVENTION

The object of the present invention is precisely to provide a sensor coil/antenna combination allowing the aforementioned problem to be largely resolved by making the quantity of flux picked up by the coil much more independent of the relative position between the card and the lines of flux generated by the reader.

More precisely, the invention concerns a contactless RF-type smart card, including a sensor coil, an electronic circuit connected to the coil and elements made of material with high magnetic permeability acting as antenna, including a first part located substantially in the plane of the upper coil surface and a second part located substantially in the plane of the lower coil surface. It is characterised in that the antenna includes a connecting part between the first and second part, positioned at the centre of the coil, the latter being dimensioned relative to the antenna such that the voltages induced across its terminals are of the same order of magnitude, whether the antenna is parallel or perpendicular to the lines of magnetic flux generated by a reader device.

BRIEF DESCRIPTION OF SEVERAL VIEW OF THE DRAWINGS

The invention will be better understood upon reading the following description, given by way of explanation and with reference to the annexed drawings, in which:

FIGS. 1 a, b and c show several embodiments of a smart card according to the invention with its antenna and its sensor coil;

FIGS. 2 a, b and c show the voltage across the terminals of the sensor coil as a function of the position of the latter in the flux for a first antenna shape; and FIGS. 3 a, b and c show the voltage across the terminals of the sensor coil as a function of the position of the latter in the flux for a second antenna shape.

DETAILED DESCRIPTION OF THE INVENTION

Reference will be made first of all to FIG. 1 which shows schematically a smart card according to the invention, in a credit card format. This is the most common format, but the invention is, of course, applicable to smart cards and other electronic tags of very varied dimensions.

The smart card shown includes a sensor coil 1 connected to an electronic circuit 2 including a memory and RF transmission means at 125 kHz, a frequency which is used very generally in this type of application. This type of circuit, well known to those skilled in the art, may be, for example, one of the circuits marketed by the EM Marin company (Switzerland) under the references H 4000, 4001 to 4005 and 4050.

An antenna 3 made of material with high magnetic permeability passes through coil 1. This antenna has to be very thin and have a particular shape. Thus, it may be made in a strip or a sheet of metal with a high nickel content such as Mumétall® or Permalloy® which are reputed to have very high magnetic permeability. Sheets which are 100 microns, or even 50 microns thick can be found on the market. This small thickness is necessary, on the one hand, in order not to significantly increase the thickness of the card and, on the other hand, to reduce eddy current losses in the antenna. Another possibility for further decreasing such losses consists in making the antenna in a stack of even thinner sheets, for example 10 or 20 microns, electrically insulated from each other like transformer plates.

The coil 1, circuit 2 and antenna 3 assembly is incorporated into the thickness of the body of card 4, for example by overmoulding with a plastic material.

Antenna 3 includes 3 zones, zone A which is in the plane of the upper coil surface, zone B which is in the plane of its lower surface and zone C which is a connecting zone between zones A and B. The over-thickness due to the antenna is limited to the thickness of zones A and B which are superposed on each of the coil surfaces. For an antenna thickness of 50 microns, there is thus an over-thickness of 100 microns. One may easily adjust the thickness of the coil to compensate for this over-thickness and keep the total thickness of the card within standard values.

In the example of FIG. 1a, antenna 3 is placed diagonally. It is straight and, since its width is markedly less than the inner diameter of coil 1, it may easily, be slid inside. It is thus made in a single piece and zone C is a simple fold which allows the difference in height between parts A and B to be compensated for.

In the absence of an antenna, the magnetic flux parallel to the surface of the smart card do not pass through coil 1 and thus do not generate any voltage across its terminals. As described in the document WO 98/52141, the fact of incorporating antenna 3 in the card enables these magnetic flux parallel to the surface of the card to be picked up, more particularly those which are along the antenna axis. These flux will pass from zone a, i.e. from the upper surface of coil 1, to zone B, i.e. towards the lower surface thereof, or vice versa, passing through the centre of coil 1 in zone C. This allows the voltage necessary for electronic circuit 2 to operate properly to be generated across the terminals of coil 1.

In the aforementioned Swiss Patent, the antenna picks up practically none of the flux perpendicular to the surface of the smart card, and its use is clearly associated with readers which generate lines of flux parallel to said surface. With such a structure, the antenna essentially allows the flux to be concentrated at the centre of the card, in a coil of small diameter, but in no way resolves the problem of neutral positions.

The present invention thus constitutes a significant improvement, mainly for << hands free >> applications insofar as it largely resolves this problem of neutral positions. By associating a conventional coil 1 of large diameter with antenna 3, as shown in FIG. 1, the flux perpendicular to the surface of the smart card pass directly through the centre of coil 1 without passing through antenna 3. With an equivalent diameter, equivalent features to those of a conventional smart card without an antenna are obtained. Thus, by combining these two systems, an antenna plus a coil of large diameter, one can make pass through the coil both the flux parallel to the surface of the card, via antenna 3, and the flux perpendicular to said surface, directly through large diameter coil 1, which is entirely consistent with the desired object of eliminating neutral positions, as will appear more clearly hereinafter.

Figure 1B:
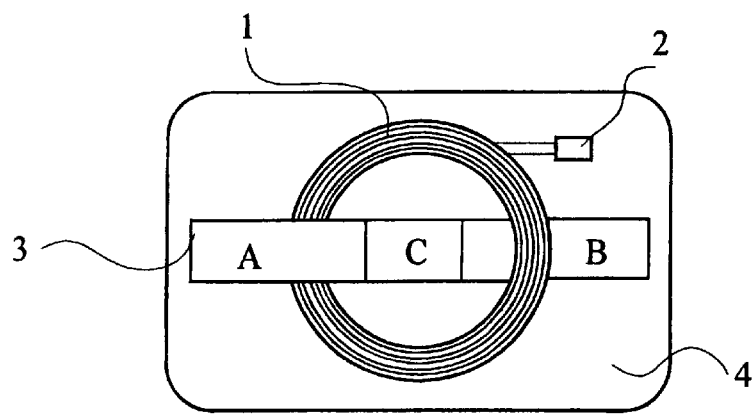

FIG. 1b shows a card wherein antenna 3 is no longer placed diagonally, but is aligned along the longitudinal axis of the smart card. Indeed, the response of the card in different positions can be modified by changing the antenna configuration, which enables the operation of the card to be optimised as a function of its application. In the case of FIG. 1b, the antenna is again made in a single piece. The features of this card are given in FIG. 2.

Figure 1C:
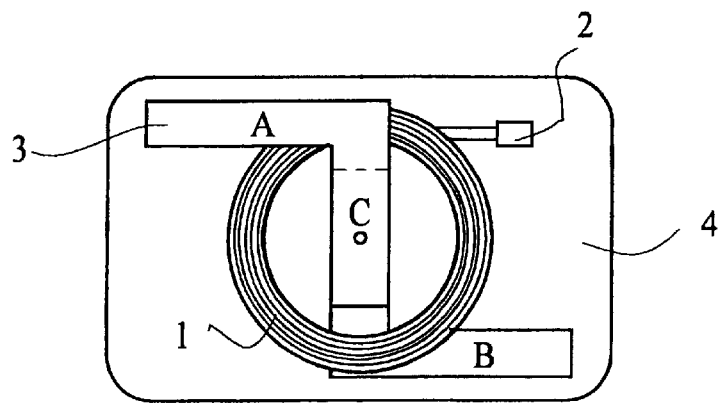

In FIG. 1c however, antenna 3 is a more complex Z-shape, allowing the features to be modified, as shown in FIG. 3. It may be easier to make it in two parts. The upper part A and the lower part B overlap in zone C and are bent so as to superpose each other. They may also be assembled by riveting, bonding, or any other method. One may also, in certain cases, have an antenna in two parts and leave a gap between them, without this being detrimental to the proper working of the system.

The voltage induced at 125 kHz across the terminals of sensor coil 1 with the antenna configuration of FIG. 1b is shown in FIG. 2. Axis X is in the direction of the length of the card, axis Y is in the direction of the width and axis Z is perpendicular to the first two, i.e. perpendicular to the surface of the card. The voltage is represented vectorially, as a function of the angle of rotation of the antenna assuming that it rotates about an axis perpendicular to the plane of the drawing. The fine line represents the voltage obtained without an antenna, and the thicker line the voltage obtained with the antenna in place. The starting position, corresponding to the angle of rotation 0, is shown to the left. Measurements are taken inside a Helmoltz coil powered by a constant current so as to have a uniform flux. The direction of this flux is horizontal, as indicated by the arrow.

Figure 2A:
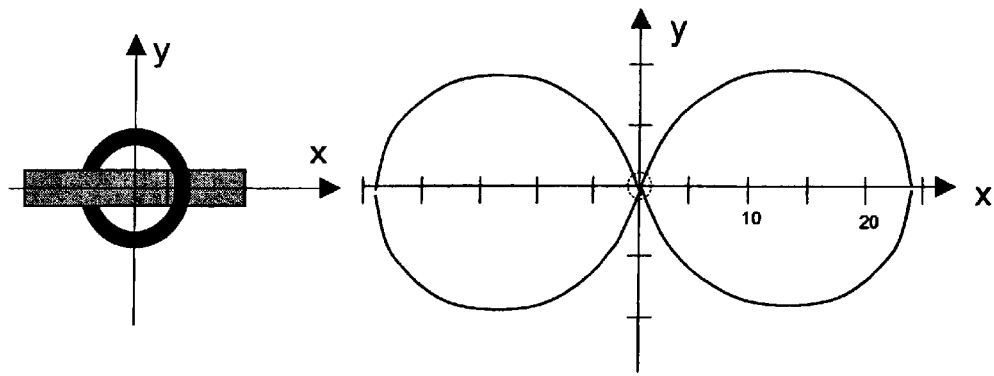

In FIG. 2a, axes X and Y are in the plane of the drawing and the card rotates about axis Z. The coil is parallel to the lines of flux over the entire 360 degrees of rotation. These lines of flux do not therefore pass through the coil so that, without an antenna (dotted curve), the induced voltage is practically zero whatever the angle.

With the antenna, the flux passing through the antenna inside the coil is maximum at 0 and 180 degrees when the antenna is parallel to the lines of flux. It is zero at 90 and 270 degrees when the antenna is perpendicular to the lines of flux. There is thus a sinusoidal distribution of the induced voltage as a function of angle. Distribution with the antenna, even if it has two zero crossovers, is in any event much more advantageous than distribution without an antenna.

Figure 2B:
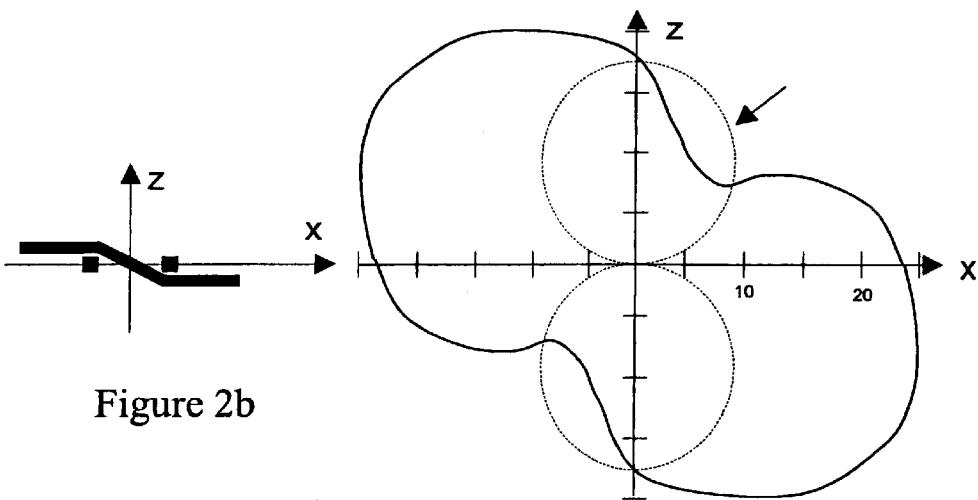

In FIG. 2b, axes Z and X are in the plane of the drawing and the card rotates about axis Y. The coil is parallel to the lines of flux at 0 and 180 degrees. It is perpendicular to the lines of flux at 90 and 270 degrees. Without an antenna (dotted curve), the flux is zero in the first case and maximum in the second. There is thus sinusoidal distribution of the induced voltage as a function of angle, with zero crossovers at 0 and 180 degrees, and maximum at 90 and 270 degrees.

With the antenna, the flux passing through the antenna inside the coil is maximum at 0 and 180 degrees when the antenna is parallel to the lines of flux. It is zero at 90 and 270 degrees when the antenna is perpendicular to the lines of flux. A very interesting phenomenon may then be observed. At 0 and 180 degrees, all of the flux passing through the coil is brought by the antenna and there is a corresponding induced voltage. At 90 and 270 degrees, the antenna is inoperative, but there is the voltage due to the direct passage of the flux through the coil, corresponding to the maximum voltage obtained when there is no antenna. In the intermediate positions, for example at 60 and 240 degrees, the flux passing through the coil directly, on the one hand, and through the antenna, on the other hand oppose each other, so that there is a certain reduction in the induced voltage, without however, there being a zero crossover. Conversely, at 140 and 330 degrees, these flux are added together, so that this is where the maximum induced voltage is found.

Figure 2C:
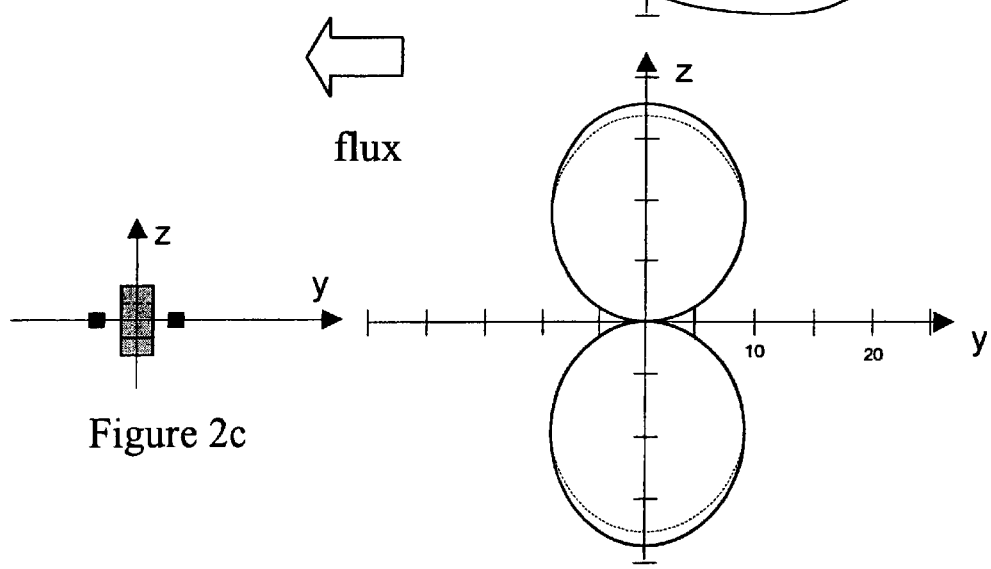

In FIG. 2c, axes Z and Y are in the plane of the drawing and the card rotates about axis X. The coil is parallel to the lines of flux at 0 and 180 degrees. It is perpendicular to the lines of flux at 90 and 270 degrees. Without the antenna (dotted curve), the flux is zero in the first case and maximum in the second. There is thus sinusoidal distribution of the induced voltage as a function of angle, with zero crossovers at 0 and 180 degrees, and maximums at 90 and 270 degrees.

In that case, the antenna is practically inoperative at all angles, so that practically the same induced voltage distribution is found as without an antenna. In such case, it is thus the use of a relatively large coil which is advantageous, whereas the antenna adds nothing. It will be noted that, without an antenna, the voltage across the terminals of the coil is proportional to the square of its diameter. With a small coil, the voltage would be negligible whatever the angle. In order to have similar performances to the smart card in the main directions, it is thus necessary to dimension the sensor coil with respect to the antenna such that the induced voltage across its terminals is of the same order of magnitude, whether the antenna is perpendicular or parallel to the lines of flux.

It can thus be seen clearly that by combining, according to the present invention, a relatively large coil which picks up the lines of flux perpendicular to the smart card which are not picked up by the antenna, whereas the latter picks up the lines of flux parallel to the smart card which are not picked up by the coil, this condition is achieved and neutral positions are considerably reduced, which cannot be achieved either with a coil alone, even a coil of large diameter, or with an antenna associated with a small coil.

Figure 3A:
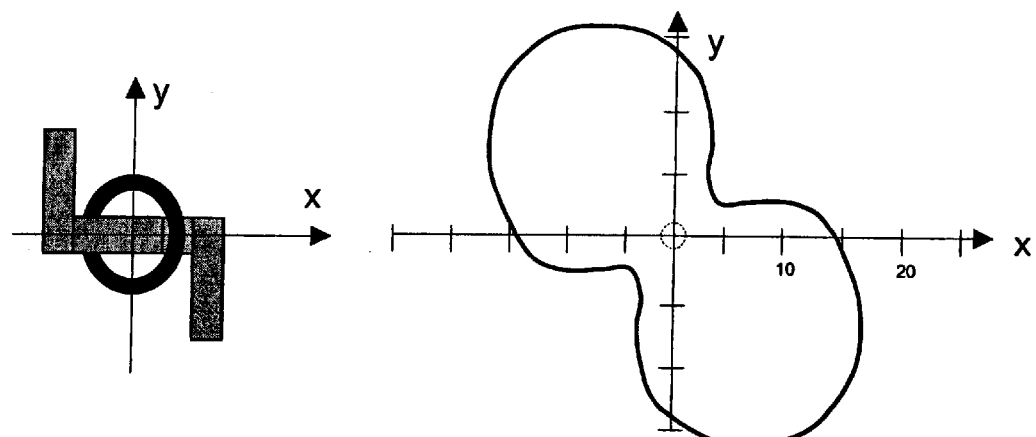
Figure 3B:
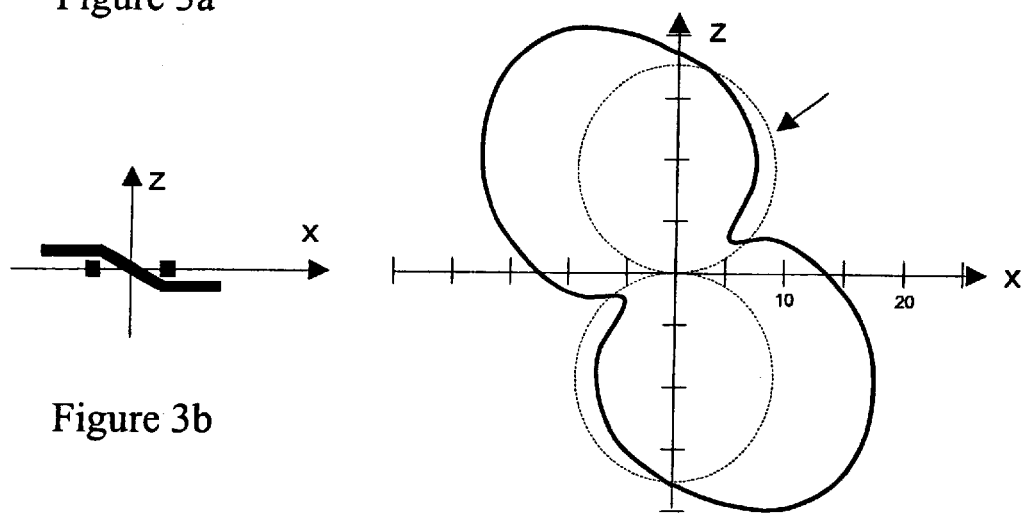
Figure 3C:
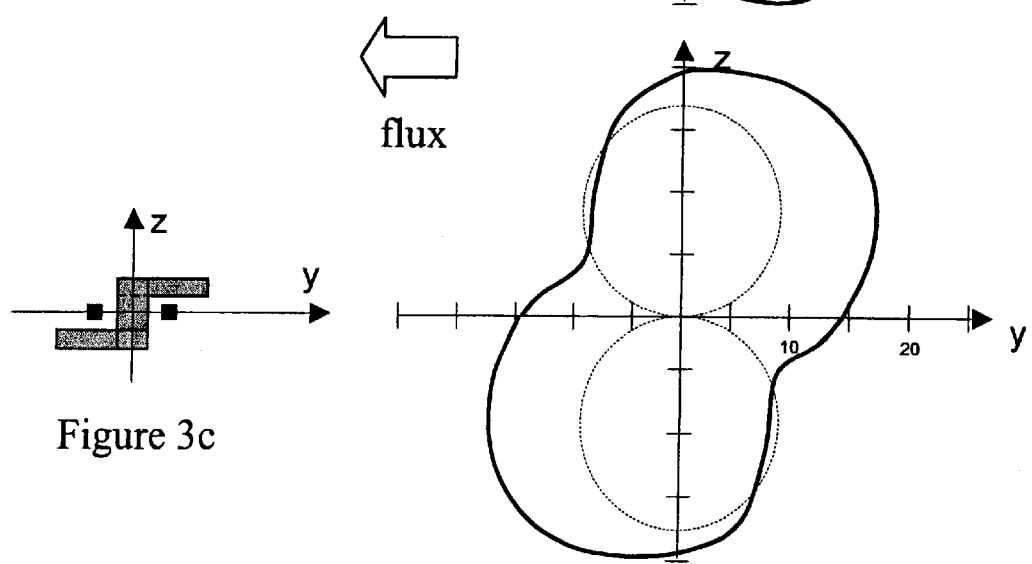

In FIG. 3, the same curves are shown, but with a Z-shaped antenna. In FIG. 3a, axes X and Y are in the plane of the drawing and the card rotates about axis Z. In FIG. 3b, axes Z and X are in the plane of the drawing and the card rotates about axis Y. Finally, in FIG. 3c, axes Z and Y are in the plane of the drawing and the card rotates about axis X. This Z-configuration of the antenna is particularly advantageous insofar as it has practically no neutral position when one rotates about axis Z (FIG. 3a). When one rotates about axes Y or X (FIGS. 3b and 3c), the flux in the antenna is zero in certain positions, but the flux which passes directly through the coil without passing through the antenna compensates for this. It can be seen that there is thus very homogenous distribution of the induced voltage in the three cases, with practically no zero crossover.

It is thus possible to adapt the features of the smart card, and more particularly its behaviour in the different positions which it might have with respect to the lines of flux generated by the reader system by adapting the shape of the antenna working in association with a sensor coil of large diameter.

Of course, other possible configurations of the smart card according to the present invention exist, but the description thereof would not add any new elements to the description of the invention.

What is claimed is:

1. A contactless radio frequency smart card, including a sensor coil (1) having at least two coil terminals, an electronic circuit (2) connected to said coil (1) and an antenna (3) made of a material with high magnetic permeability, the antenna (3) including a first part (A) located substantially in the plane of the upper coil surface and a second part (B) located substantially in the plane of the lower coil surface, characterised in that said antenna (3) includes a connecting part (C) between the first part (A) and the second part (B), the connecting part (C) passing substantially through the centre of the coil (1), wherein said coil (1) is dimensioned relative to the antenna (3) such that the voltages induced across said coil terminals are of the same order of magnitude, whether the antenna is parallel or perpendicular to the lines of flux generated by a reader.

2. A smart card according to claim 1, characterised in that the antenna (3) is made in a thin sheet or strip of metal with high magnetic permeability.

3. A smart card according to claim 1, characterised in that the antenna (3) is made of a metal with a high nickel content.

4. A smart card according to claim 1, characterised in that the antenna (3) is made in a single piece, the connecting part (C) consisting of a fold passing through the centre of the coil (1).

5. A smart card according to claim 1, characterised in that the antenna (3) is made in two parts, the first (A) and the second (B) parts overlapping each other at the centre of the coil (1) in the connecting part (C).

6. A smart card according to claim 1, characterised in that the antenna (3) is straight.

7. A smart card according to claim 1, characterised in that the antenna (3) is placed diagonally.

8. A smart card according to claim 1, characterised in that the antenna (3) is Z-shaped.

* * * * *